United States Patent Office 3,662,060

Patented May 9, 1972

3,662,060

TOOTHPASTES COMPRISING STABILIZED MILLED ALPHA-ALUMINA TRIHYDRATE

John Walter Clippingdale, Egham, and Charles Andrew Watson, Ruislip, England, assignors to Lever Brothers Company, New York, N.Y.

No Drawing. Filed Oct. 14, 1969, Ser. No. 866,397
Claims priority, application Great Britain, Oct. 29, 1968, 51,285/68
Int. Cl. A61k *7/16*
U.S. Cl. 424—57 3 Claims

ABSTRACT OF THE DISCLOSURE

Using milled alpha-alumina trihydrate as a toothpaste abrasive can sometimes give rise to corrosion of unlacquered aluminum tubes accompained by the production of hydrogen gas. This can be prevented by stabilising the alumina by the action thereon of orthophosphate ions.

This invention relates to toothpastes and in particular to toothpastes comprising alpha-alumina trihydrate.

In work we have carried out on the formulation of toothpastes containing alpha-alumina trihydrate as abrasive cleaning agent, instances occurred in which the alumina gave rise to corrosion of unlacquered aluminium tubes accompained by the swelling of the tubes due to the production of hydrogen gas when the toothpaste was stored. These instances of corrosive action occurred when a different method was employed for milling and classifying the relatively coarse hydrated alumina raw material. The alumina trihydrate used in our experiments was made by the Bayer process in which alumina is precipitated from a solution of sodium aluminate, washed and then dried at a low temperature. The corrosive action occured even at neutral pH and so could not have been caused by any residual alkalinity of the alumina.

We have, however, discovered that milled hydrated alumina having corrosive properties can be stabilised and rendered non-corrosive by the action of orthophosphate ions. Thus it was surprisingly found that if a batch of alumina that gave rise to tube corrosion and gassing when made up into a toothpaste and packed in unlacquered aluminium tubes was first pre-treated with a 0.1 M aqueous solution of sodium dihydrogen phosphate and then well washed with water until no soluble orthophosphate remained, stabilisation occurred. This was shown by an absence of corrosion and tube blowing on storage of toothpastes made up from the pre-treated alumina and packed in unlacquered aluminium tubes. The results showed that the inhibition of corrosion was due to stabilisation of the alumina and not to the action of phosphate ions on the aluminium tubes. The mechanism of the stabilisation of otherwise corrosive grades of alumina is not understood but it is believed to be due in some way to the modification of the surface characteristics of the alumina particles: this was shown by differences between the electrophoretic mobilities of the alumina particles before and after the treatment.

It has further been found that to obtain this stabilisation it is not necessary to actually pre-treat the alumina but that the stabilising action of the orthophosphate ions on the alumina can be effected simply by including these ions in the toothpaste formulation.

According to the present invention, therefore, there is provided a toothpaste composition comprising a milled alpha-alumina trihydrate stabilised by the action of orthophosphate ions, the milled alpha-alumina trihydrate being such that without its being stabilised the toothpaste when incorporated into an unlacquered aluminium tube would cause corrosion and gassing to occur. The stabilisation of the alumina is preferably effected by the simple expedient of including a source of orthophosphate ions in the toothpaste formulation.

The orthophosphate ions can be provided by the use of orthophosphoric acid or its salts such as the alkali metal, alkaline-earth metal and ammonium salts. Amine salts of orthophosphoric acid are also effective. Particular examples of suitable salts are sodium dihydrogen phosphate, disodium hydrogen phosphate, dicalcium hydrogen phosphate, diammonium hydrogen phosphate and bis-triethanolamine hydrogen phosphate.

The effective amount of orthophosphoric acid or its salts may be determined by suitable experiment but will usually be at least 0.1% by weight of the toothpaste. Normally a level of from 0.2 to 1% by weight is convenient depending upon the amount of alumina used and the particular source of orthophosphate ions employed. A preferred source of orthophosphate ions is sodium dihydrogen phosphate since this can serve the dual role of stabilising the alumina and controlling the pH. In order to avoid acid or alkaline attack of the aluminium the pH of the toothpaste should be in the range about 6 to about 8.

The invention is applicable to a wide range of toothpaste formulae but is especially applicable to those containing substantial amounts of hydrated alumina, such as from 25 to 60% by weight of the toothpaste.

The following examples illustrate the invention.

EXAMPLE 1

A toothpaste was made to the following composition using a Bayer process alpha-alumina trihydrate which had been milled and classified and was a particle size suitable for use as a toothpaste abrasive cleaning agent.

| Ingredient: | Percent by weight |
|---|---|
| Milled alpha-alumina trihydrate | 55.00 |
| Sorbitol (70% syrup) | 27.00 |
| Sodium carboxymethyl cellulose | 0.80 |
| Benzoic acid | 0.15 |
| Sodium lauryl sulphate | 1.50 |
| Titanium dioxide | 0.50 |
| Saccharin | 0.20 |
| Peppermint flavour | 1.00 |
| Water | 100.00 |
| pH 6.4. | |

When packed in aluminium tubes which were not lacquered internally, and stored for 3 months at 37° C., gassing was found to have occured within the tube (mainly hydrogen gas) and signs of tube corrosion were noted.

The inclusion of 0.1% of sodium dihydrogen phosphate in the above toothpaste composition stabilised the alumina.

Pastes were also made by including 0.4% of sodium dihydrogen phosphate in the formula as above except for the omission of the benzoic acid and these were stable upon storage for up to nine months at 65° C. These pastes had a pH of 6.8.

Experiments on toothpaste formulae such as the above have shown that part of the sodium dihydrogen phosphate is taken up by the alumina and that it is this part which acts to stabilise the alumina.

EXAMPLE 2

The stabilisation of a milled alpha-alumina trihydrate in the toothpaste composition as set forth above in Example 1 was effected by including 1% dicalcium orthophosphate dihydrate in the composition.

EXAMPLE 3

The stabilisation of a milled alpha-alumina trihydrate in the toothpaste composition as set forth above in Example 1 was effected by including 0.5% diammonium hydrogen orthophosphate in the composition.

EXAMPLE 4

The stabilisation of a milled alpha-alumina trihydrate in the toothpaste composition as set forth above in Example 1 was effected by including 1% bistriethanolamine hydrogen orthophosphate in the composition.

What is claimed is:

1. A toothpaste composition having a pH of about 6 to about 8 comprising from about 25% to about 60% by weight of milled alpha-alumina trihydrate and a stabilizer comprising orthophosphate ions, said orthophosphate ions being effective to stabilize said alpha-alumina trihydrate against corrosion of unlacquered aluminium tubes.

2. A toothpaste in accordance with claim 1 wherein said orthophosphate ions are derived from an alkali metal, alkaline earth metal, ammonium, or amine salt of orthophosphoric acid.

3. A toothpaste in accordance with claim 1 wherein said orthophosphate ions are derived from sodium dihydrogen phosphate.

References Cited

FOREIGN PATENTS

| 1,559,196 | 1/1969 | France | 424—49 |
|---|---|---|---|
| 824,285 | 12/1951 | Germany | 424—49 |

OTHER REFERENCES

Dental Abstracts, vol. 14, pp. 274–275, May 1969.

RICHARD L. HUFF, Primary Examiner

U.S. Cl. X.R.

23—52